(12) United States Patent
Chien et al.

(10) Patent No.: US 7,600,727 B2
(45) Date of Patent: Oct. 13, 2009

(54) EQUIPMENT CAPABLE OF ADJUSTING HEIGHT THEREOF

(76) Inventors: Shu-Mei Chien, c/o Beng Corporation, No. 157, Shan-Ying Rd., Kweishan, Taoyuan (TW); Chia-Lin Chang, c/o Beng Corporation, No. 157, Shan-Ying Rd., Kweishan, Taoyuan (TW)

( * ) Notice: Subject to any disclaimer, the term of this patent is extended or adjusted under 35 U.S.C. 154(b) by 0 days.

(21) Appl. No.: 11/611,935

(22) Filed: Dec. 18, 2006

(65) Prior Publication Data
US 2007/0205351 A1 Sep. 6, 2007

(30) Foreign Application Priority Data
Mar. 3, 2006 (TW) .............................. 95107141 A

(51) Int. Cl.
*F16M 11/00* (2006.01)
(52) U.S. Cl. ................................................. 248/188.4
(58) Field of Classification Search ............. 248/188.4, 248/188.2, 188.8; 411/84
See application file for complete search history.

(56) References Cited

U.S. PATENT DOCUMENTS

| | | | |
|---|---|---|---|
| 5,765,476 A | * | 6/1998 | McKeever ............... 101/127.1 |
| 6,698,899 B2 | * | 3/2004 | Yamada et al. ............... 353/61 |
| 7,287,732 B2 | * | 10/2007 | Balistreri ................. 248/188.4 |
| 2004/0141827 A1 | * | 7/2004 | Dicke .......................... 411/413 |
| 2006/0006295 A1 | * | 1/2006 | Gainer .................... 248/188.4 |
| 2006/0164610 A1 | * | 7/2006 | Yoshikawa ................. 353/101 |
| 2006/0186287 A1 | * | 8/2006 | Bender .................... 248/188.2 |
| 2007/0034770 A1 | * | 2/2007 | Chiu .......................... 248/616 |
| 2008/0146976 A1 | * | 6/2008 | Chen ........................... 601/51 |

FOREIGN PATENT DOCUMENTS

TW 273743 Y 8/2005

* cited by examiner

*Primary Examiner*—Ramon O Ramirez
(74) *Attorney, Agent, or Firm*—Perkins Coie LLP

(57) ABSTRACT

The invention discloses an equipment including a main body and N multi-threaded shafts. The main body has a bottom, and N multi-threaded holes are formed on the bottom of the main body, wherein N is a natural number. Each of the N multi-threaded shafts is screwed into one of the N multi-threaded holes via a head end thereof. Each of the N multi-threaded shafts has a manual part at a tail end thereof, wherein the manual part of each of the N multi-threaded shafts is capable of being operated to rotate the shaft relative to the bottom of the main body, so as to adjust a height of the equipment.

19 Claims, 5 Drawing Sheets

EQUIPMENT CAPABLE OF ADJUSTING HEIGHT THEREOF

BACKGROUND OF THE INVENTION

1. Field of the Invention

The invention relates to an equipment capable of adjusting its height, and more particularly to an equipment which utilizes at least one multi-threaded screw to adjust its height more effectively.

2. Description of the Prior Art

When an equipment, such as a projector, is placed on a plane, the user often adjusts the height of the equipment according to different needs. For example, when the user uses a projector to display images, he/she always desires to adjust the projected images to a position appropriate for watching. In general, most of the conventional projectors utilize the adjuster foot disclosed in a Japan patent to adjust the height. Also, some conventional projectors utilize general single-thread screw to adjust the height.

Referring to FIG. 1, FIG. 1 is a side view illustrating the single-thread screw 1 of the prior art. The lead (L) of the single-thread screw 1 is equal to the pitch (P), as shown in FIG. 1. In other words, when the single-thread screw 1 is rotated in one complete circle, the movement along the axis of the screw 1 is equal to one pitch. It is inefficient for the user when the height needs to be adjusted. Furthermore, there are always two single-thread screws mounted onto the two sides of the conventional projector, such that the user can adjust the height of both sides of the projector at the same time. However, since each of the screws has the same direction of rotation, it is inconvenient for the user to adjust the height with both hands at the same time.

Referring to FIGS. 2A and 2B, FIG. 2A is a sectional view illustrating the adjuster foot 10 of the prior art. FIG. 2B is a sectional view illustrating the button 12 being released from the adjuster foot 10 shown in FIG. 2A. As shown in FIG. 2A, the adjuster foot 10 comprises a button 12, an engaging member 14, a screw rod 16, and a fixed base 18. The screw rod 16 has lots of threads thereon, and the engaging member 14 has lots of grooves capable of cooperating with the thread pitch of the screw rod 16. When the adjuster foot 10 is in a closed position, the grooves of the engaging member 14 engage with the threads of the screw rod 16, as shown in FIG. 2A. When the user wants to adjust the height of the projector (not shown), he/she only needs to press the button 12, so as to get the engaging member 14 moving away from the screw rod 16, as shown in FIG. 2B. In other words, the user can adjust the height of the projector by the screw rod 16. However, the conventional adjuster foot has some drawbacks listed below:

1. The structure of the conventional adjuster foot is complicated, and the cost is high.
2. The adjuster foot cannot support projectors with heavier weight, or the thread will be stripped.
3. The engaging member 14 has to cooperate with the screw rod 16 precisely, or the mechanism may lose the original function.

Therefore, the scope of the invention is to provide an equipment capable of adjusting its height to solve the aforesaid problems.

SUMMARY OF THE INVENTION

A scope of the invention is to provide an equipment which utilizes at least one multi-threaded shaft to adjust the height more effectively.

Another scope of the invention is to provide an equipment which utilizes at least one first shaft with left-hand thread and at least one second shaft with right-hand thread for the user to adjust the height with both hands at the same time.

According to a preferred embodiment, the equipment of the invention comprises a main body and N multi-threaded shafts. The main body has a bottom, and N multi-threaded holes are formed on the bottom of the main body, wherein N is a natural number. Each of the N multi-threaded shafts is screwed into one of the N multi-threaded holes via a head end thereof. Furthermore, each of the N multi-threaded shafts has a manual part at a tail end thereof. The manual part of each of the N multi-threaded shafts is capable of being operated to rotate the multi-threaded shaft relative to the bottom of the main body, so as to adjust the height of the equipment. Since the lead of multi-threaded shaft is multiple times the pitch of the multi-threaded shaft, it is more effective for the user to adjust the height of the equipment.

Furthermore, the N multi-threaded shafts comprise M first multi-threaded shafts and M second multi-threaded shafts, and the N multi-threaded holes comprise M first multi-threaded holes and M second multi-threaded holes, wherein M is a natural number, and N is equal to or greater than 2M. Each of the M first multi-threaded shafts corresponds to one of the M first multi-threaded holes, and each of the M second multi-threaded shafts corresponds to one of the M second multi-threaded holes, wherein each of the M first multi-threaded shafts and each of the M first multi-threaded holes are left-hand threaded, and each of the M second multi-threaded shafts and each of the M second multi-threaded holes are right-hand threaded. Accordingly, the user can operate the first multi-threaded shaft and the second multi-threaded shaft with both hands at the same time. Thus, it is more convenient for the user to adjust the height of the equipment.

Therefore, according to the equipment of the invention, since the lead of the multi-threaded shaft is multiple times the pitch of the multi-threaded shaft, it is more effective for the user to adjust the height of the equipment. Moreover, since the first and the second multi-threaded shafts have thread types of opposite direction, the user can operate one of the first multi-threaded shafts and one of the second multi-threaded shafts with both hands at the same time. Accordingly, it is more convenient for the user to adjust the height of the equipment ergonomically.

The advantage and spirit of the invention may be understood by the following recitations together with the appended drawings.

BRIEF DESCRIPTION OF THE APPENDED DRAWINGS

DETAILED DESCRIPTION OF THE INVENTION

Figure 1:
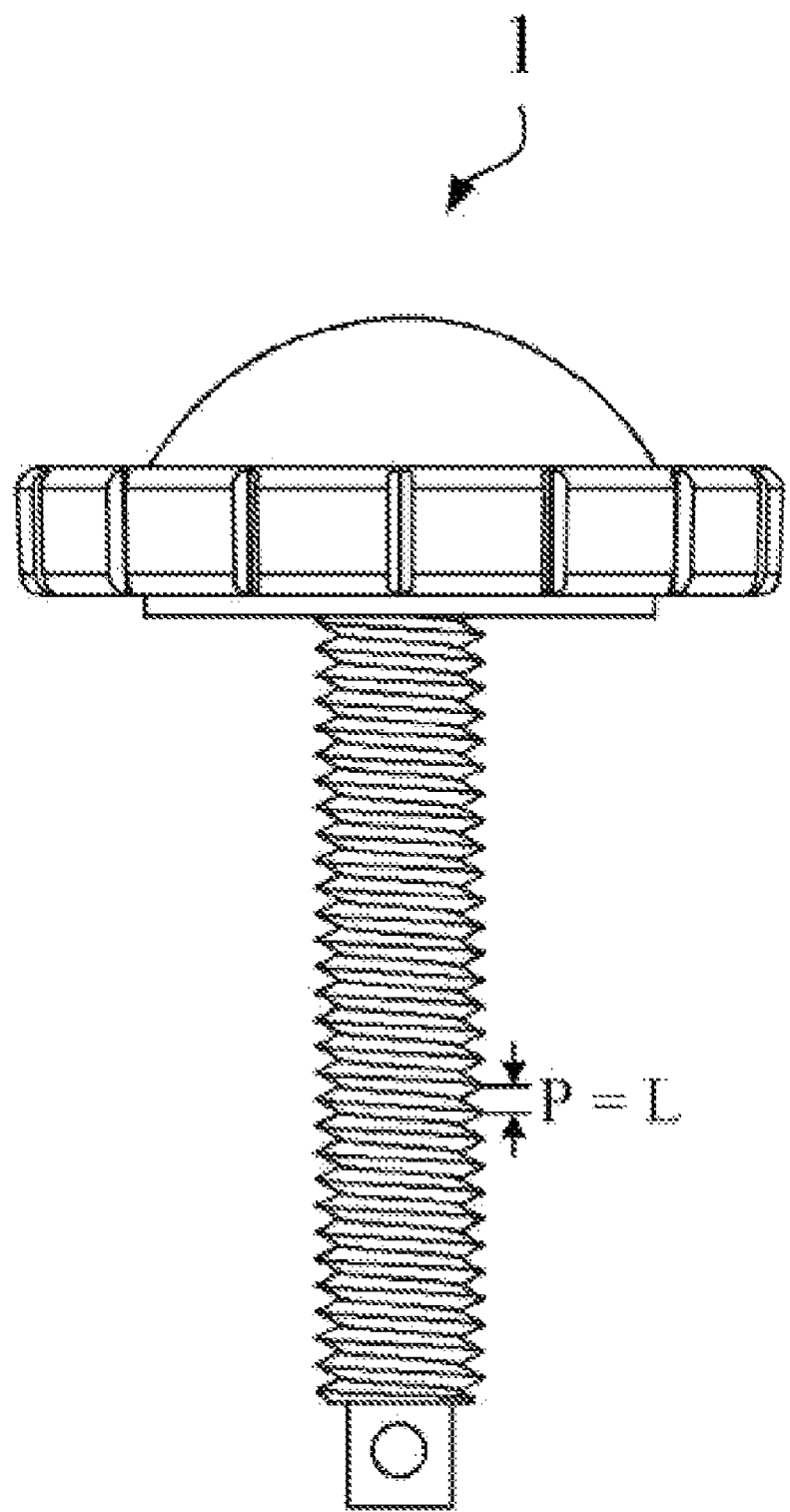
FIG. 1 is a side view illustrating the single-thread screw of the prior art.
Figure 2A:
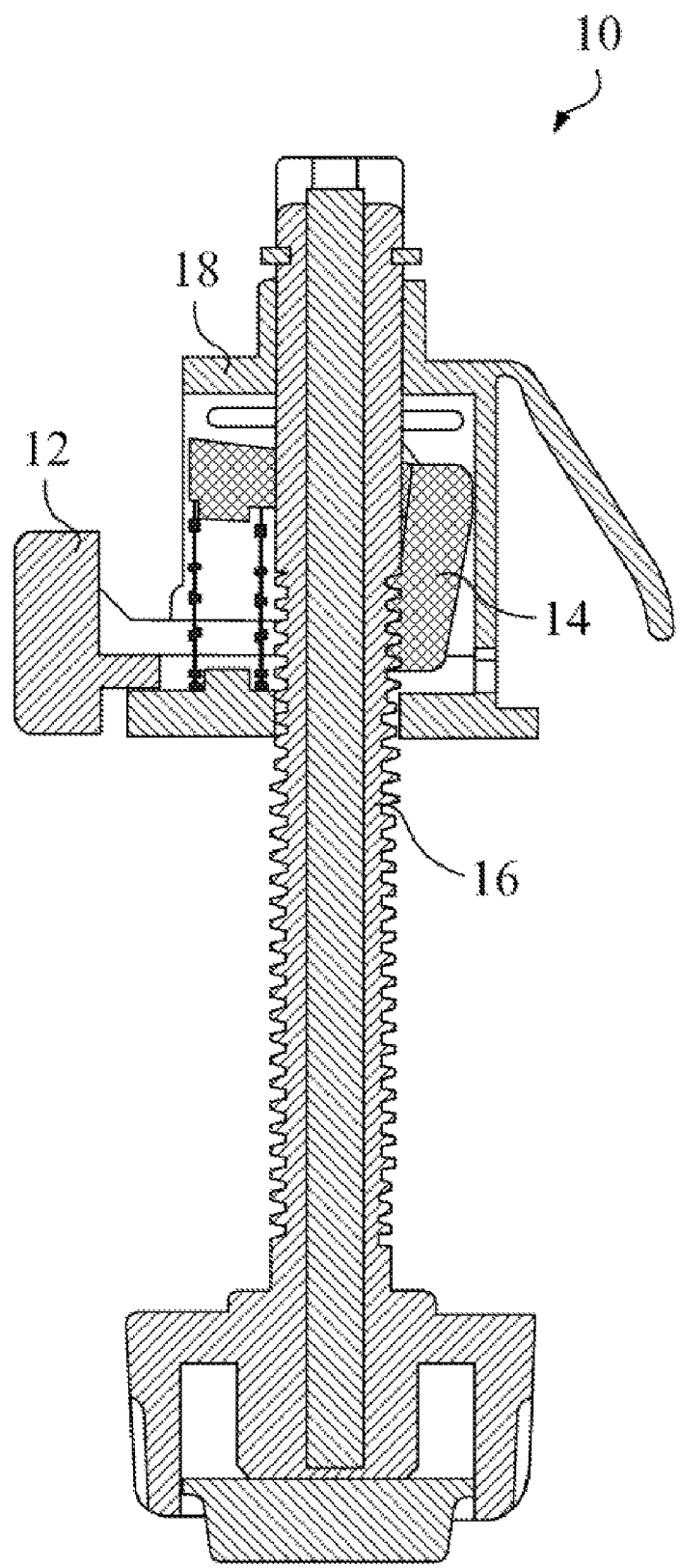
FIG. 2A is a sectional view illustrating the adjuster foot of the prior art.
Figure 2B:
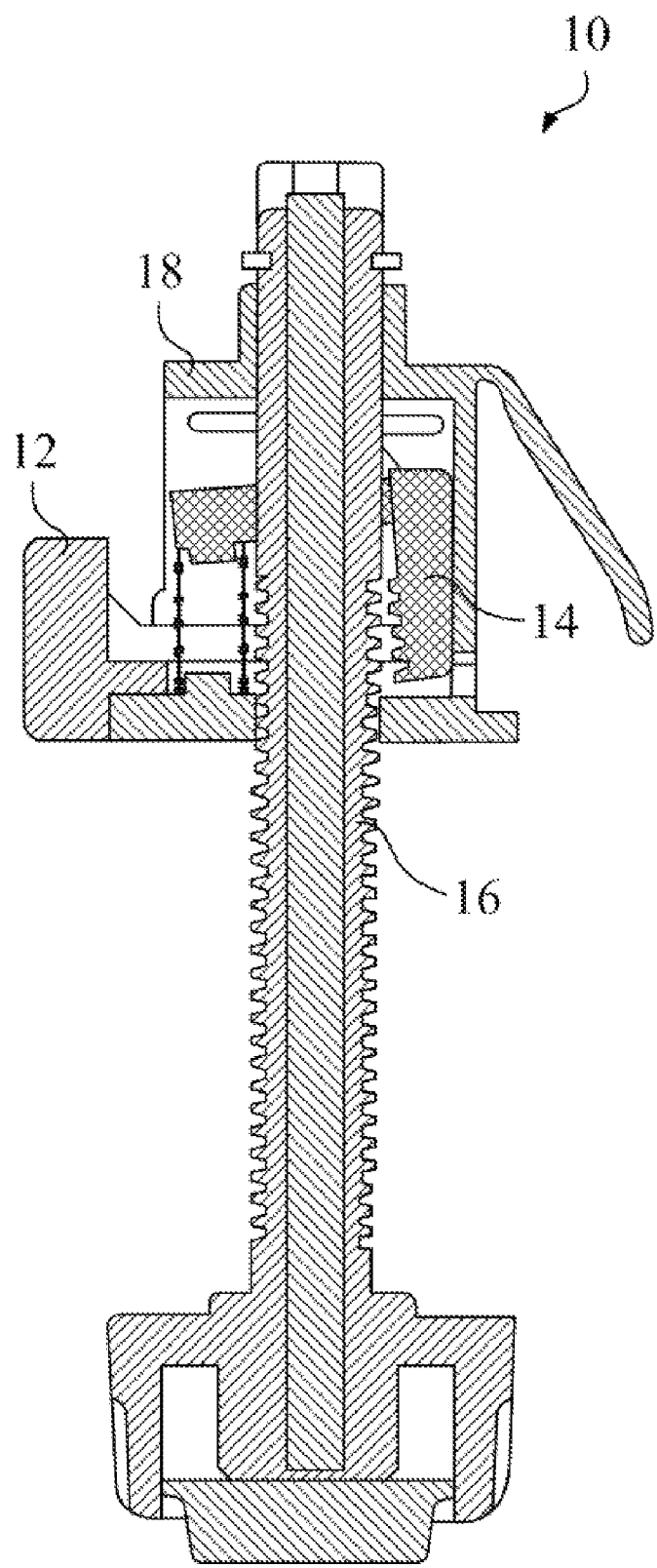
FIG. 2B is a sectional view illustrating the button released from the adjuster foot shown in FIG. 2A.
Figure 3:
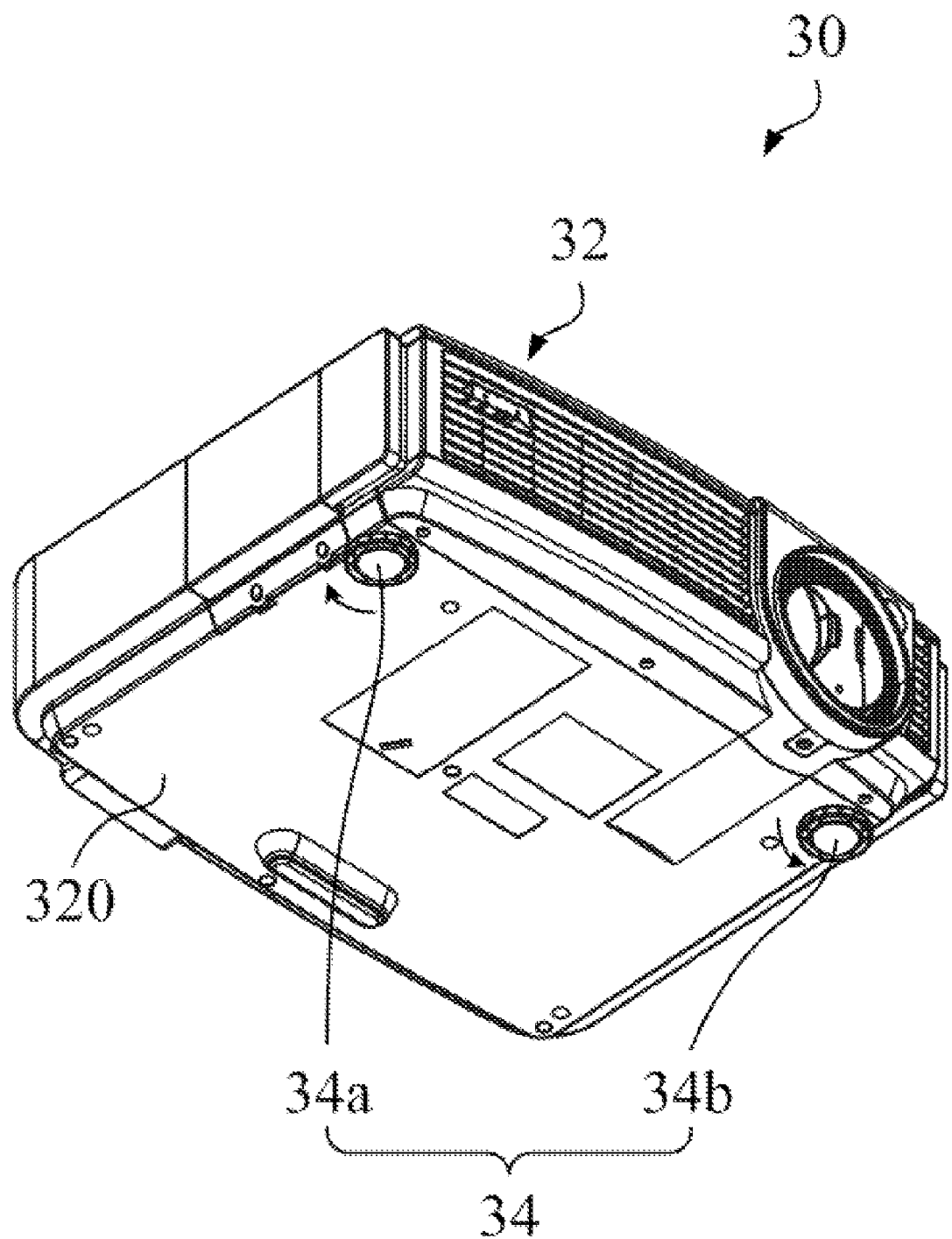
FIG. 3 is a perspective view illustrating the equipment according to a first preferred embodiment of the invention.
Figure 4:
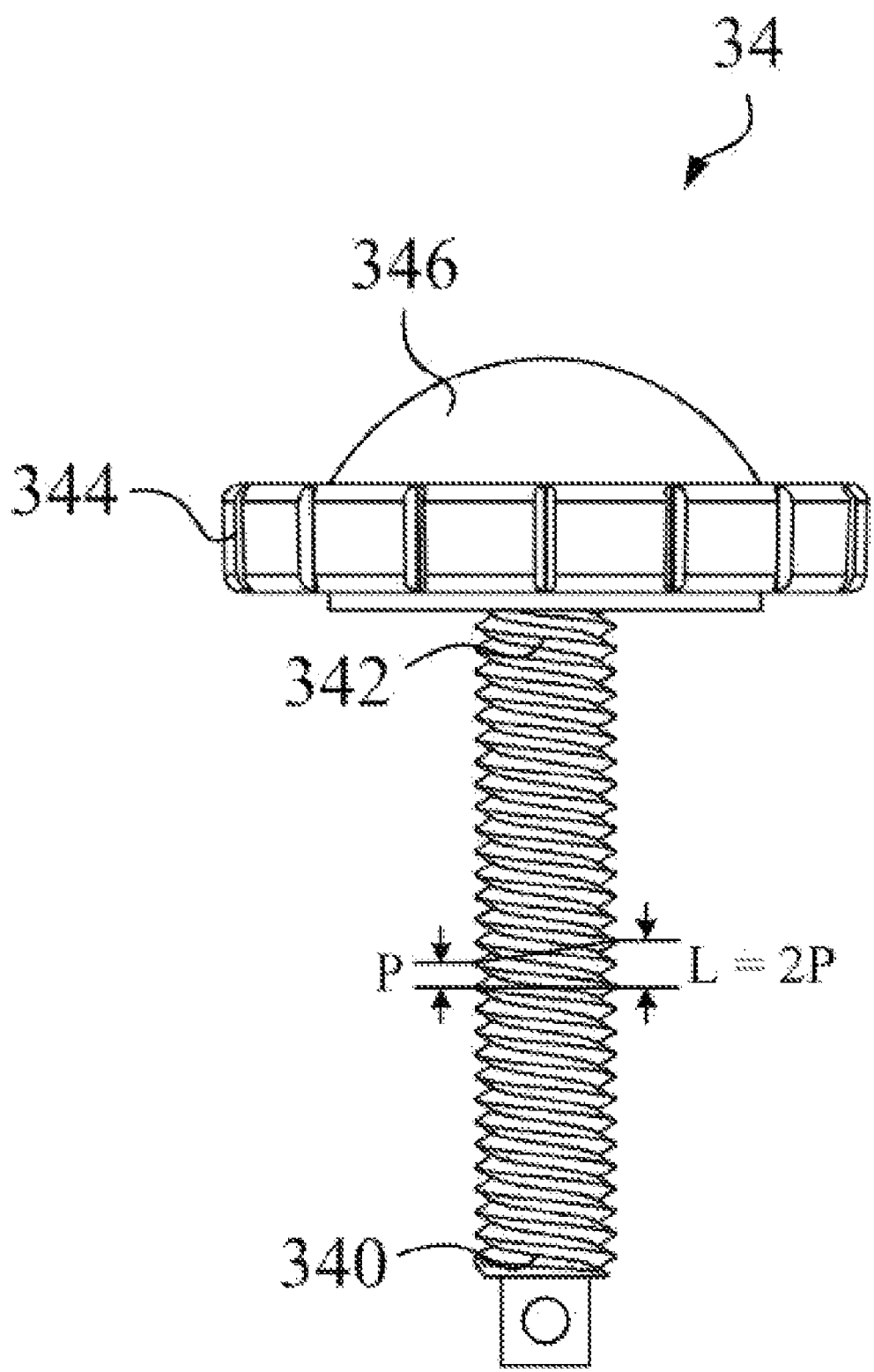
FIG. 4 is a side view illustrating the shaft shown in FIG. 3.

Referring to FIGS. 3 and 4, FIG. 3 is a perspective view illustrating the equipment 30 according to a first preferred embodiment of the invention. FIG. 4 is a side view illustrating the shaft 34 shown in FIG. 3. The equipment 30 comprises a main body 32 and N multi-threaded shafts 34, wherein N is a natural number. In this first embodiment, the equipment 30 is a projector, and it comprises two shafts 34; the main body 32 is a casing of the projector, as shown in FIG. 3. In this embodiment, each of the shafts 34 is double-threaded. As shown in FIG. 4, the lead of the double-threaded shaft 34 is two times the pitch of the double-threaded shaft 34. In other words, when the double-threaded shaft 34 is rotated in a complete circle, the movement along the axis of the shaft 34 is equal to two pitches. Accordingly, it is more effective for the user to adjust the height of the equipment 30. In another preferred embodiment of the invention, the thread of the shaft 34 can be designed as multi-threaded other than double-threaded (e.g. triple-threaded), and it will be more effective for the user to adjust the height of the equipment 30.

As shown in FIG. 3, the main body 32 has a bottom 320, and two holes (not shown in FIG. 3) are formed on the bottom 320 of the main body 32, wherein each of the holes is double-threaded. Each of the shafts 34 is screwed into one of the two holes via a head end 340 thereof, and each of the shafts 34 has a manual part 344 at a tail end 342 thereof, as shown in FIG. 4. In this embodiment, the manual part 344 is a plastic pedestal. The manual part 344 of each shaft 34 is capable of being operated to rotate the shaft 34 relative to the bottom 320 of the main body 32, so as to adjust the height of the equipment 30.

As shown in FIG. 3, the two shafts 34 comprise a first shaft 34a and a second shaft 34b, and the two holes (not shown in FIG. 3) comprise a first hole and a second hole. The distance between the first hole and a center of gravity of the main body 32 is substantially the same as the distance between the second hole and the center of gravity of the main body 32. The first shaft 34a corresponds to the first hole, and the second shaft 34b corresponds to the second hole, wherein the first shaft 34a and the first hole are left-hand threaded, and the second shaft 34b and the second hole are right-hand threaded. Accordingly, the user can operate the first shaft 34a and the second shaft 34b with both hands at the same time, so as to adjust the height of the equipment 30 more conveniently and effectively.

As shown in FIG. 4, each of the shafts 34 further comprises a rubber pad 346 mounted onto the manual part 344 for absorbing the shock caused by adjusting the height of the equipment 30.

Compared to the prior art, according to the equipment of the invention, since the lead of the multi thread is equal to a multiple of the pitch, it is more effective for the user to adjust the height of the equipment. Furthermore, since the first and the second multi-threaded shafts have thread types of opposite direction, the user can operate the first multi-threaded shaft and the second multi-threaded shaft with both hands at the same time. Accordingly, it is more convenient for the user to adjust the height of the equipment ergonomically. Moreover, the structure of the invention is simpler than the prior art, and the cost is further reduced.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. An electronic device comprising:
   a main body having a bottom portion and a multi-threaded hole disposed in the bottom portion;
   a multi-threaded shaft having a head end and a tail end; and
   a manual part on the tail end of the shaft,
   wherein the multi-threaded shaft is receivable in the multi-threaded hole via the head end, and
   wherein the manual part is capable of being operated to rotate the multi-threaded shaft relative to the bottom of the main body and adjust a height of the electronic device.

2. The electronic device of claim 1 wherein:
   the multi-threaded shaft is a first multi-threaded shaft, and wherein the device further includes a second multi-threaded shaft;
   the multi-threaded hole is a first multi-threaded hole, and wherein the main body further includes a second multi-threaded hole disposed in the bottom portion;
   the first multithreaded shaft is receivable in the first multi-threaded hole;
   the second multi-threaded shaft is receivable in the second multi-threaded hole;
   the first multi-threaded shaft and the first multi-threaded hole are left-hand threaded; and
   the second multi-threaded shaft and the second multi-threaded hole are right-hand threaded.

3. The electronic device of claim 2 wherein the distance between the first multi-threaded hole and a center of gravity of the main body and the distance between the second multi-threaded hole and the center of gravity of the main body are substantially the same.

4. The electronic device of claim 1 wherein the manual part is a plastic pedestal.

5. The electronic device of claim 1 wherein the multi-threaded shaft further comprises a rubber pad mounted onto the manual part.

6. The electronic device of claim 1 wherein the main body is a casing of a projector.

7. The electronic device of claim 1 wherein the multi-threaded shaft includes a threaded portion positioned between the head end and the tail end, and wherein a lead of the threaded portion is equal to a multiple of a pitch of the threaded portion.

8. The projector of claim 7 wherein the lead is equal to 2× the pitch.

9. The electronic device of claim 1 wherein the manual part is an integral component of the multi-threaded shaft.

10. A projector comprising:
    a main body having a bottom, a first multi-threaded hole, and a second multi-threaded hole disposed on the bottom of the main body, wherein the first multi-threaded hole is left-hand threaded, and the second multi-threaded hole is right-hand threaded;
    a first multi-threaded shaft having a left hand thread, a first head end, and a first tail end, the first tail end including a first manual part, wherein the first multi-threaded shaft is receivable in the first multi-threaded hole via the first head end; and
    a second multi-threaded shaft having a right hand thread, a second head end, and a second tail end, the second tail end including a second manual part, wherein the second multi-threaded shaft is receivable in the second multi-threaded hole via the second head end,
    wherein the first manual part of the first multi-threaded shaft and the second manual part of the second multi-threaded shaft are operable to rotate the first multi-threaded shaft and the second multi-threaded shaft, respectively, relative to the bottom of the main body so as to adjust a height of the projector.

11. The projector of claim 10 wherein the distance between the first multi-threaded hole and a center of gravity of the main body is substantially the same as the distance between the second multi-threaded hole and the center of gravity of the main body.

12. The projector of claim 10 wherein the manual part is a plastic pedestal.

13. The projector of claim 10 wherein the first multi-threaded shaft and the second multi-threaded shaft each further comprise a rubber pad mounted onto the manual part.

14. The projector of claim 10 wherein the main body is a casing of a projector.

15. The projector of claim 10 wherein the first multi-threaded shaft includes a triple threaded portion, and wherein the second multi-threaded shaft includes a triple threaded portion.

16. A height adjustment device for adjusting the height of a projector, the height adjustment device comprising:
- a threaded screw including
  - a shaft having a head portion, a tail portion and a threaded portion disposed between the head portion and the tail portion; and
  - a manually rotatable portion attached to the tail portion, wherein the threaded portion includes multi-threads having equal to or greater than double-threads, and
  wherein a lead of the multi-threads is equal to a multiple of a pitch of the multi-threads; and
- a threaded hole disposed in a bottom of the projector, the threaded hole capable of rotatably receiving the threaded screw therein for manually adjusting the height of the projector.

17. The height adjustment device of claim 16 wherein the threaded portion includes a triple-threaded portion.

18. The height adjustment device of claim 16 wherein the lead is equal to 2× the pitch.

19. The height adjustment device of claim 16 wherein:
- the threaded screw includes a first threaded screw having a left hand threaded portion;
- the height adjustment device includes a second threaded screw having a right hand threaded portion;
- the threaded hole is a first threaded hole capable of receiving the first threaded screw; and
- the height adjustment device includes a second threaded hole capable of receiving the second threaded screw.

* * * * *